(12) United States Patent
Riant et al.

(10) Patent No.: US 7,035,515 B2
(45) Date of Patent: Apr. 25, 2006

(54) OPTICAL WAVEGUIDE AND METHOD FOR CREATING AN ASYMMETRICAL OPTICAL FILTER DEVICE

(75) Inventors: Isabelle Riant, Orsay (FR); Carlos De Barros, Boulogne-Billancourt (FR)

(73) Assignee: Avonex Corporation, Fremont, CA (US)

( * ) Notice: Subject to any disclaimer, the term of this patent is extended or adjusted under 35 U.S.C. 154(b) by 299 days.

(21) Appl. No.: 10/140,201

(22) Filed: May 8, 2002

(65) Prior Publication Data

US 2002/0186944 A1 Dec. 12, 2002

(30) Foreign Application Priority Data

Jun. 11, 2001 (EP) .................................. 01440164

(51) Int. Cl.
*G02B 6/02* (2006.01)
(52) U.S. Cl. ........................................ 385/127; 385/142
(58) Field of Classification Search .................. 385/37, 385/27, 28, 15, 127, 31, 128
See application file for complete search history.

(56) References Cited

U.S. PATENT DOCUMENTS

| | | | | |
|---|---|---|---|---|
| 5,852,690 A | * | 12/1998 | Haggans et al. ............... | 385/37 |
| 5,881,197 A | * | 3/1999 | Dong et al. .................. | 385/127 |
| 6,005,999 A | * | 12/1999 | Singh et al. ................... | 385/37 |
| 6,009,222 A | * | 12/1999 | Dong et al. ................. | 385/127 |
| 6,104,852 A | * | 8/2000 | Kashyap ...................... | 385/123 |
| 6,314,221 B1 | * | 11/2001 | Riant et al. .................... | 385/37 |
| 6,516,118 B1 | * | 2/2003 | Brilland et al. ................ | 385/37 |

FOREIGN PATENT DOCUMENTS

| | | |
|---|---|---|
| FR | 2 779 237 A1 | 12/1999 |
| WO | WO 99/27401 A1 | 6/1999 |

OTHER PUBLICATIONS

Hewlett S J et al.: "Coupling Characteristics of Photo-Induced Bragg Gratings in Depressed- and Matched- Cladding Fibre" Optical and Quantum Electronics, Chapman and Hall, London, GB, vol. 28, No. 11, Nov. 1, 1996, pp. 1641-1654, XP002072666).

\* cited by examiner

*Primary Examiner*—Joseph Williams
*Assistant Examiner*—Dalei Dong
(74) *Attorney, Agent, or Firm*—Patterson & Sheridan

(57) ABSTRACT

The invention is related to an optical waveguide device comprising
a length of fiber including a monomode core having a refraction index of $n_{co}$, a photosensitivity of $S_{co}$ and a radius $R_{co}$
and an internal cladding with an refractive index of $n_{cl}$, a photosensitivity of $S_{cl}$ and a radius of $R_{cl}$,
and a outer cladding surrounding the internal cladding with an refractive index that allows the existence of multiple cladding modes,
and a slanted Bragg grating with an effective tilt angle of θ written in core and inner cladding of the optical waveguide, coupling the fundamental mode into several cladding modes where $R_{cl} \leq 2.5\, R_{co}$ and the $S_{co} \leq S_{cl}$.

14 Claims, 3 Drawing Sheets

OPTICAL WAVEGUIDE AND METHOD FOR CREATING AN ASYMMETRICAL OPTICAL FILTER DEVICE

BACKGROUND OF THE INVENTION

Figure 1:
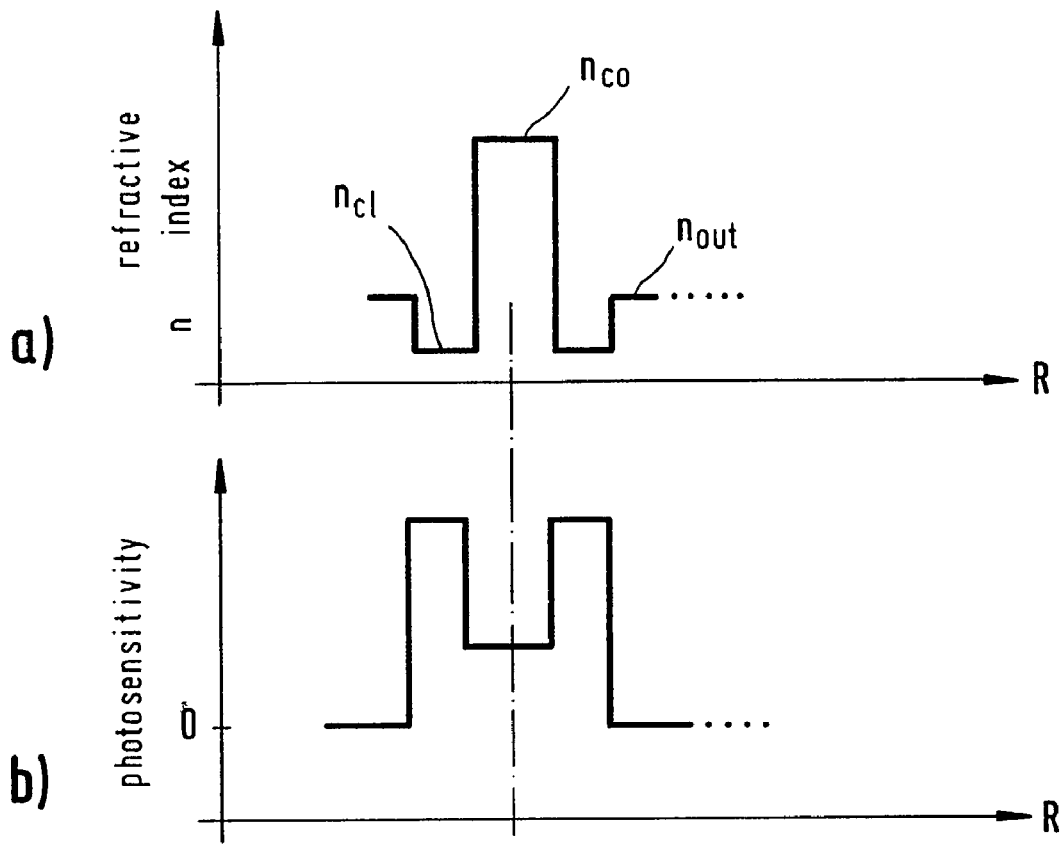

The invention is related to an optical waveguide device and method for creating an asymmetrical optical filter device. In particular the invention is related to an optical waveguide device with a special structure of core and inner and outer cladding so that an asymmetrical coupling of fundamental mode with the cladding modes of the device can be obtained.

The invention is also related to a method for creating an asymmetrical optical filter device by a special coupling of the fundamental mode with multiple cladding modes using special fiber design.

Bragg gratings in optical fibers have been known to be extremely useful features in the field of telecommunication for quite some years. Versatile filter and reflector systems can be carried out conveniently by use of such gratings. An important application is the optical gain equalization in long distance fiber lines. In order to compensate for the loss over long distances optical amplifiers are incorporated into the lines in certain spatial intervals. Unfortunately, in multiplexed systems the amplifier gain response usually is not flat over the whole range of all wavelength channels. Thus, a gain equalization by spatially succeeding filter systems is necessary. The filter characteristics, i.e. the "shape" of the filter, has to be optimized according to the characteristics of the fiber line, the amplifier systems and the wavelength range.

Slanted Bragg gratings SBG are used to couple light of certain over amplified wavelengths into the cladding modes of the fiber, while other wavelengths remain unaffected. The SBG is a standard fiber Bragg grating tilted during photo inscription with an angle between the grating fringes and the normal of the fiber axis. This SBG couples part of the fiber-guided mode into radiation modes or cladding modes in a counter-propagating direction. The envelope of couplings into the different cladding modes yields the filter shape. The envelope of couplings is defined by the specific fiber design. It is for example known from FR-A-9806904, to provide a photosensitive cladding to reduce the spectral width of the filter and a reduced photosensitivity in the core to decrease the back reflection into the fundamental mode, whereby the grating can be short (800 µm) or chirped to suppress the modulation due to coupling into discrete modes. By chirping the fringe period along the grating length, or by shortening the grating, each discrete filter corresponding to the coupling into each cladding mode is enlarged, so that they can overlap each other.

Especially in systems of a wide spectral range or in systems with very uneven spectral distribution, however, a single slanted Bragg grating often is not enough to yield a satisfying equalization of the amplifier gain. Thus, a chain of several slanted Bragg gratings with different characteristics can be concatenated one after the other to represent a row of spectrally succeeding filters. The succeeding fiber sections containing one filter each are spliced together.

In the U.S. Pat. No. 6,005,999 an optical filter is disclosed that offers a narrowband rejection filter that couples out of a forward propagating core mode. The design of this device allows the coupling of the fundamental mode to one cladding mode. The coupling to a single cladding mode allows to design the narrow band filters with for example a FWHM of around 0.3 nm. The filter characteristic is symmetric.

For a filter with a broader spectral width more than one cladding mode is coupled to the fundamental mode $LP_{01}$. The French application 98 06 904 disclosed a filter having a symmetric shape, defined by the envelope of the cladding modes in the fiber. Often the gain equalization in transmission systems requires asymmetric shapes of fillers. Up to now solutions with symmetric concatenated filters are used.

SUMMARY OF THE INVENTION

The invention provides a solution to create asymmetrical shaped filters in one single Bragg grating written in a special designed fiber. The solution is realized by a fiber including a monomode core having a refraction index of $n_{co}$, a photosensitivity of $S_{co}$ and a radius $R_{co}$ and an internal cladding with a refractive index of $n_{cl}$, a photosensitivity of $S_{cl}$ and a radius of $R_{cl}$, and an outer cladding surrounding the internal cladding with an refractive index that allows the existence of multiple cladding modes, and a slanted Bragg grating with an effective tilt angle of $\theta$ written in core and inner cladding of the optical waveguide, coupling the fundamental mode into several cladding modes where $R_{cl} \leq 2.5\, R_{co}$ and the $S_{co} \leq S_{cl}$ Preferably the device also comprises a Bragg grating wherein the slant angle $\theta$ is higher than 2.5°. In the most preferably embodiment the angle is selected to be between 4 and 5°. With this value an optimal coupling is obtained between fundamental and cladding modes.

Preferably the device also comprises a design where the ratio of photosensitivities $S_{co}$ and $S_{cl}$ is between 20 and 90%. This allows to decrease the back-reflection into the fundamental mode.

Preferably the device also comprises a design where the photosensitivities $S_{co}$ and $S_{cl}$ are equal. This allows, for systems permitting higher values of back-reflection into the fundamental mode, to realize filters wither higher contrast.

Preferably the device also comprises a design where the internal cladding is depressed or matched or have a positive refractive index.

Preferably the device also comprises a design where the core has a radius $R_c > 3$ µm. In the most preferably embodiment the core has a radius equal to 4 µm. This is an important aspect for the filter so that it can be easily spliced to standard single mode fibers in telecommunication networks. The adaptation of core radius to the common used radius in single mode fibers helps to avoid losses in case of splices.

Preferably the device also comprises a design where the period of the slanted grating is uniform. In a preferably embodiment the length of this uniform grating is lower than 1 mm. The slanted grating with a uniform period is the easiest slanted grating to imprint in a fiber. With a long grating, the discrete cladding mode coupling arises clearly in the filter shape. Imprinting a short length slanted grating allows to smooth the spectrum. This is due to the fact that each unitary filter overlaps the adjacent unitary filter smoothing in result the transmission spectrum.

Preferably the device also comprises a design where the period of the slanted grating is chirped. The chirping of the grating period smoothes the mode structure of the filter. Without a chirp the discrete cladding mode coupling arises clearly in the filter shape. Imprinting a slanted grating with a chirped period allows to smooth the spectrum. This is due to the fact that each unitary filter overlaps the adjacent unitary filter smoothing in result the transmission spectrum.

The method to create a asymmetrical shaped optical filter bases on the fact that the coupling into cladding modes can be influenced by a design rule.

DESCRIPTION OF THE INVENTION

Preferred embodiments and examples are described in the figures and in the following description.

Figure 2:
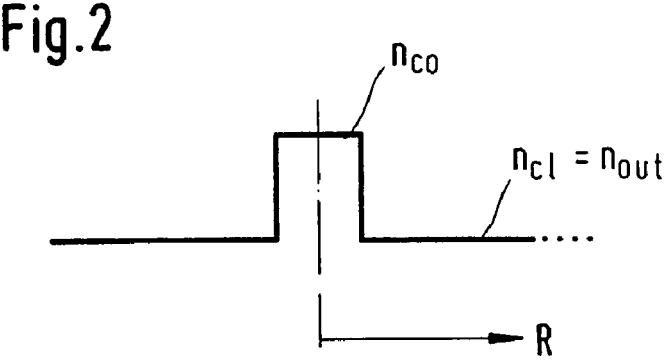

FIGS. 1a and 1b are graphical representations of the radial refractive index distribution and the radial photosensitivity FIG. 2 is a second representation of a refractive index distribution FIGS. 3a–3f are simulations of mode coupling and the resulting filter shapes.

FIG. 1a illustrates the radial distribution of refractive indices for a first embodiment of the invention. The refractive indexes n show in a schematic way the situation in a fiber with depressed inner cladding. In this embodiment the refractive index of the core nco has a higher absolute value than the refractive index of the outer cladding. The refractive index of the outer cladding has a higher value than the refractive index of the inner cladding. This forms a depressed well and the total index step is defined as difference between $n_{co}$ and $n_{cl}$.

FIG. 1b illustrates the function of photosensitivity versus the radius R of the fiber. The photosensitivity in the core $S_{co}$ has a lower value than the photosensitivity in the inner cladding region.

FIG. 2 illustrates a second embodiment of the inventional fiber. The refractive index profile is the profile of a index matched inner cladding. The profile of the photosensitivity remain as shown in FIG. 1b.

FIG. 3 shows the results of a simulation with all relevant parameters of the optical fiber to obtain a asymmetric shape of filter.

The used fiber has a:
Core radius of 4 μm
Step index of $6.5 \cdot 10^{-3}$
Depressed cladding Dn $10^{-3}$
Photosensitivity ratio between core and cladding 50%
For the grating:
Photoinduced modulation $10^{-3}$
Period of the grating is chirped with 2 nm/cm
Length of the grating 10 mm The simulation with the parameters above mentioned shows the overlap integrals between fundamental and cladding modes and the resulting transmission spectrum.

Figure 3A:
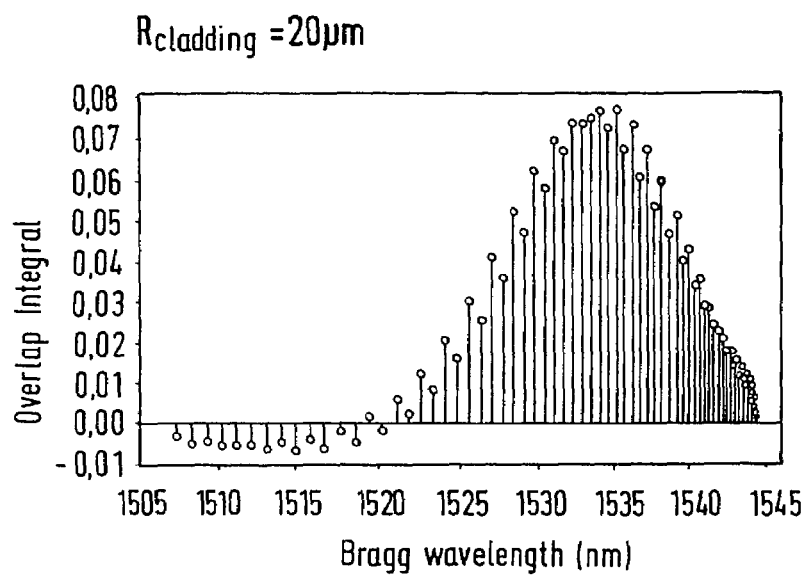
Figure 3B:
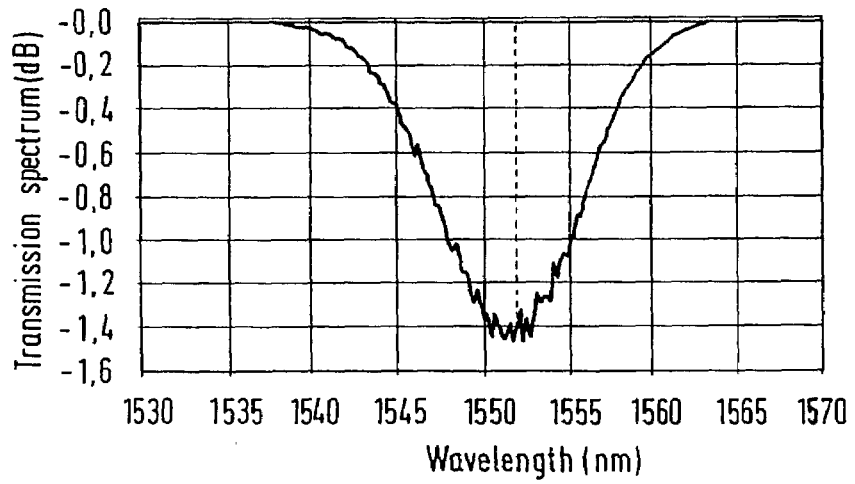
Figure 3C:
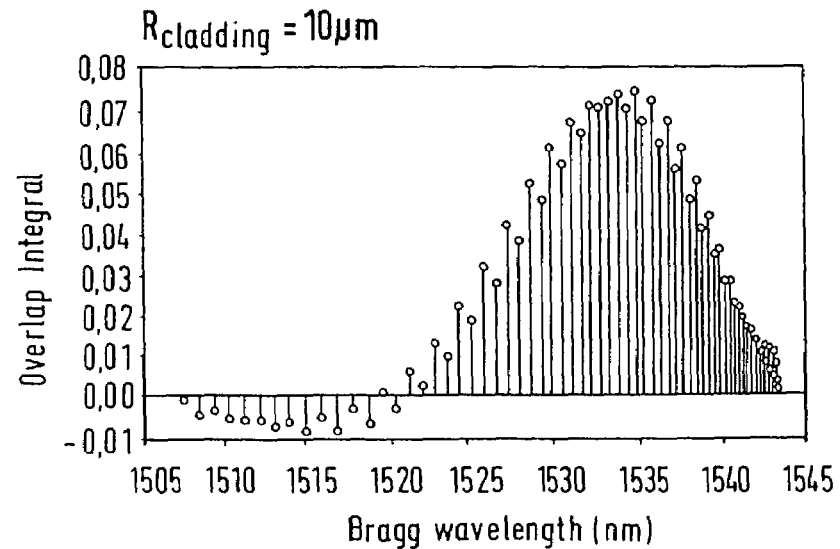
Figure 3D:
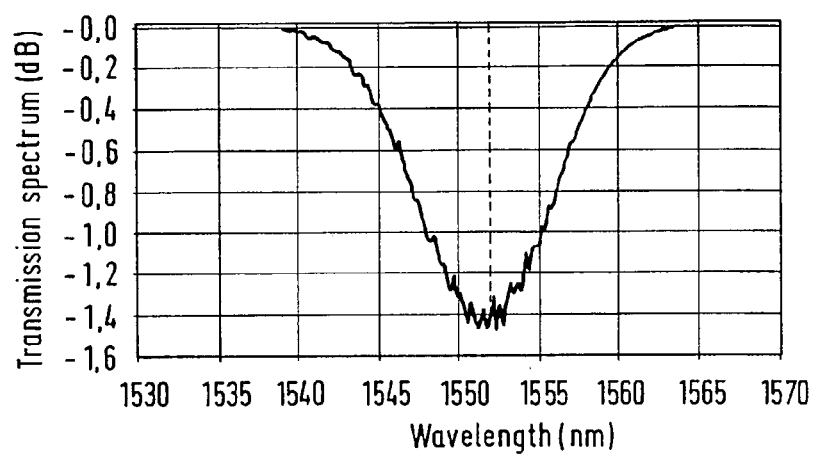
Figure 3E:
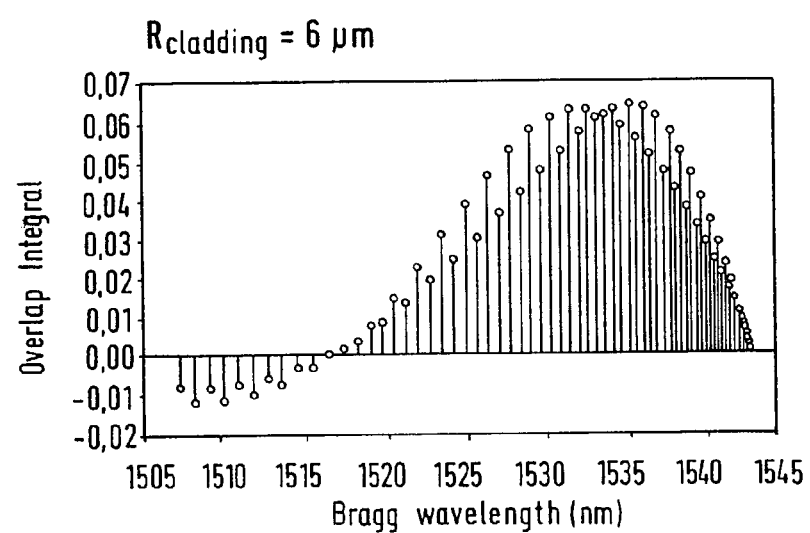
Figure 3F:
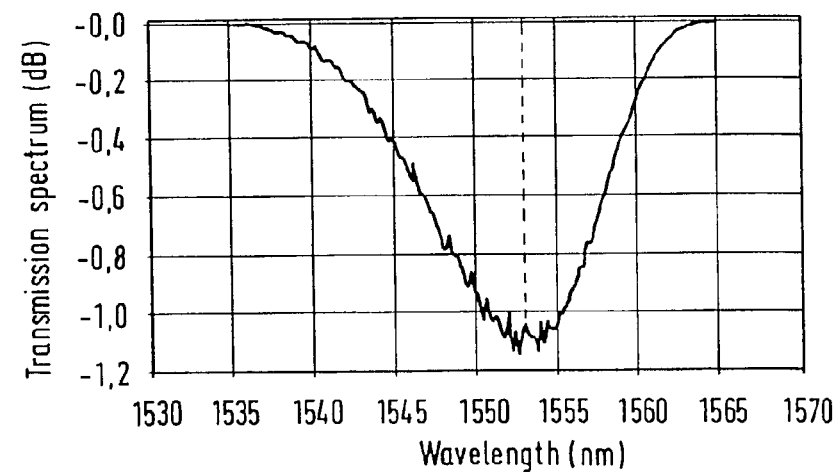

FIG. 3a starts with a radius of the cladding of 20 μm. The resulting transmission spectrum 3b is symmetric. Reducing the cladding radius in 3c to a value of 10 μm the coupling becomes asymmetric and the transmission curve shifts to a asymmetric function. With a cladding radius of only 6 μm the result is clearly asymmetric in FIG. 3f.

This example is calculated with a tilt angle θ of 5°. If this angle is decreased the shape of the filter will be more asymmetric.

A set of optimal parameters for the design of an asymmetric filter allows to create the dependence that the fundamental mode is differently coupled into symmetric cladding mode $LP_{0m}$ and asymmetric cladding modes $LP_{1m-1}$ for m=2,3,4. Therefore the symmetry of the coupling is broken.

The optical asymmetric filter is used in transmission systems as passive components for equalization of signal strengths over a wavelength range. The filters are especially used for optical fiber amplifying systems to achieve flat gain spectra for a wavelength comb.

The invention claimed is:

1. An optical waveguide device, comprising:
    a length of fiber including a monomode core having a refractive index of nco, a photosensitivity of $S_{co}$ and a radius $R_{co}$;
    an internal cladding with a refractive index of $n_{cl}$, a photosensitivity of $S_{cl}$ and a radius of $R_{cl}$;
    an outer cladding surrounding the internal cladding with a refractive index that allows the existence of multiple cladding modes; and
    a slanted Bragg grating with an effective tilt angle of θ written in the core and inner cladding of the optical waveguide, coupling the fundamental mode into several cladding modes;
    wherein:
        the refractive index of the internal cladding is less than the refractive index of the outer cladding,
        the photosensitivity of the internal cladding is greater than the photosensitivity of the core,
        $R_{cl} \leq 2.5\ R_{co}$, and
        the optical waveguide device is configured to produce an asymmetric transmission spectrum, and
        the photosensitivity of the internal cladding is constant between the core and the outer cladding.

2. An optical waveguide according to claim 1 wherein the tilt angle θ is greater than 2.5°.

3. An optical waveguide according to claim 1 wherein the core and the inner cladding are Germanium.

4. An optical waveguide according to claim 1, wherein the ratio of photosensitivities $S_{co}$ to $S_{cl}$ is between 20 and 90%.

5. An optical waveguide according to claim 1 where the core has a radius $R_c > 3$ μm.

6. An optical waveguide according to claim 1 where the period of the slanted grating is uniform.

7. An optical waveguide according to claim 1 where the period of the slanted grating is chirped.

8. Transmission system using at least one optical device according to claim 1.

9. An optical waveguide according to claim 1 where the internal cladding has a positive refractive index.

10. An optical waveguide according to claim 1 wherein $R_{cl} \leq 1.5\ R_{co}$.

11. An optical waveguide device, comprising:
    a length of fiber including a monomode core having a refractive index of nco, a photosensitivity of $S_{co}$ and a radius $R_{co}$;
    an internal cladding with a refractive index of $n_{cl}$, a photosensitivity of $S_{cl}$ and a radius of $R_{cl}$;
    an outer cladding surrounding the internal cladding with a refractive index that allows the existence of multiple cladding modes; and
    a slanted Bragg grating with an effective tilt angle of θ written in the core and inner cladding of the optical waveguide, coupling the fundamental mode into several cladding modes;
    wherein:
        the refractive index of the internal cladding is equal to the refractive index of the outer cladding,
        the photosensitivity of the internal cladding is greater than the photosensitivity of the core,
        $R_{cl} \leq 2.5\ R_{co}$,
        the optical waveguide device is configured to produce an asymmetric transmission spectrum, and
        the photosensitivity of the internal cladding is constant between the core and the outer cladding.

12. An optical waveguide according to claim 11 where the internal cladding has a positive refractive index.

13. An optical waveguide according to claim 11 wherein $R_{cl} \leq 1.5\ R_{co}$.

14. An optical waveguide according to claim 11 wherein the tilt angle θ is greater than 2.5°.

* * * * *